US007339298B2

(12) United States Patent
Salinardi et al.

(10) Patent No.: US 7,339,298 B2
(45) Date of Patent: Mar. 4, 2008

(54) COMPLIANT MOTOR DRIVEN VARIABLE ELECTRICAL DEVICE

(75) Inventors: John J. Salinardi, Middlebury, CT (US); James L. Rosen, West Hartford, CT (US)

(73) Assignee: Superior Electric Holding Group LLC., Farmington, CT (US)

( * ) Notice: Subject to any disclaimer, the term of this patent is extended or adjusted under 35 U.S.C. 154(b) by 64 days.

(21) Appl. No.: 11/072,464

(22) Filed: Mar. 7, 2005

(65) Prior Publication Data

US 2005/0200443 A1 Sep. 15, 2005

Related U.S. Application Data

(60) Provisional application No. 60/551,037, filed on Mar. 9, 2004.

(51) Int. Cl.
*H02K 7/06* (2006.01)

(52) U.S. Cl. .......................................... 310/80; 310/91

(58) Field of Classification Search .............. 310/68 A, 310/68 E, 91, 51, 81, 83, 84, 75 D
See application file for complete search history.

(56) References Cited

U.S. PATENT DOCUMENTS 2,928,961 A * 3/1960 Morrill ........................ 310/91
3,447,047 A * 5/1969 Lindsay ...................... 361/289
3,510,137 A * 5/1970 Freier ...................... 369/263.1
3,568,583 A * 3/1971 Horberg et al. ............. 396/427
3,757,721 A * 9/1973 Ohishi ........................ 114/315
3,941,339 A * 3/1976 McCarty ..................... 248/603
4,168,459 A * 9/1979 Roesel, Jr. ................... 322/29
4,191,237 A * 3/1980 Voege ........................ 160/188
4,276,043 A * 6/1981 Eddy et al. ................. 493/160
4,394,594 A * 7/1983 Schmider et al. ......... 310/68 R
4,442,367 A * 4/1984 Suzuki ........................ 310/91
4,602,176 A * 7/1986 Baker .......................... 310/51
4,800,308 A * 1/1989 Tice ............................ 310/83
5,058,456 A * 10/1991 Manrique et al. ......... 74/606 R
5,214,448 A * 5/1993 Venthem ................. 346/139 R
5,404,772 A * 4/1995 Jester ....................... 74/606 R
5,486,667 A * 1/1996 Castonguay et al. ........ 200/400
5,488,259 A * 1/1996 Cho ............................ 310/91
5,545,867 A * 8/1996 Castonguay et al. ........ 200/400
5,652,417 A * 7/1997 Tsai et al. .................. 200/6 R
5,906,271 A * 5/1999 Castonguay et al. ........ 200/400
6,406,399 B1 * 6/2002 Ai ............................. 475/183
6,427,308 B1 * 8/2002 Brunken, Jr. ................ 29/434
6,462,930 B1 * 10/2002 Nemoto et al. ............. 361/279
6,487,925 B2 * 12/2002 Fischer et al. ................ 74/337
6,508,713 B1 * 1/2003 Kaye ........................... 464/71
6,573,625 B2 * 6/2003 Shimizu et al. ............... 310/71
6,601,307 B2 * 8/2003 Meyer ........................ 33/1 PT (Continued)

*Primary Examiner*—Dang Le
(74) *Attorney, Agent, or Firm*—Morgan, Lewis & Bockius, LLP.

(57) ABSTRACT

A motor driven electrical device includes: a variable electrical device having a rotational variable control; a first support plate positioned above the variable electrical device; a motor support plate pliably attached to the first support plate using a pliable separator positioned between the motor support plate and the upper support; a motor mounted on the motor support plate, the motor having an output shaft; an interface/control unit coupling the output shaft to the rotational variable control; and stanchions attached to the first support plate for holding the first support plate in a fixed relation with respect to the variable electrical device.

16 Claims, 10 Drawing Sheets

U.S. PATENT DOCUMENTS

| | | | | |
|---|---|---|---|---|
| 6,663,531 | B2 * | 12/2003 | Skrabs | 475/348 |
| 6,740,991 | B2 * | 5/2004 | Takagi et al. | 310/51 |
| 6,768,234 | B2 * | 7/2004 | Aoki | 310/68 A |
| 6,780,137 | B1 * | 8/2004 | Langenfeld | 475/231 |
| 6,885,119 | B2 * | 4/2005 | Aoki | 310/78 |
| 6,914,363 | B2 * | 7/2005 | Kim et al. | 310/261 |
| 7,021,599 | B2 * | 4/2006 | DeGrazia et al. | 248/645 |
| 7,053,510 | B2 * | 5/2006 | Doi | 310/89 |
| 2005/0168075 | A1 * | 8/2005 | Reynolds et al. | 310/12 |
| 2005/0200443 | A1 * | 9/2005 | Salinardi et al. | 336/160 |
| 2006/0038452 | A1 * | 2/2006 | Lesak | 310/90 |
| 2006/0055246 | A1 * | 3/2006 | Johnson et al. | 310/156.23 |
| 2006/0201278 | A1 * | 9/2006 | Pizzichil et al. | 74/640 |

* cited by examiner

COMPLIANT MOTOR DRIVEN VARIABLE ELECTRICAL DEVICE

The present invention claims the benefit of Provisional Application No. 60/551,037 filed on Mar. 9, 2004, which is hereby incorporated by reference in entirety.

BACKGROUND OF THE INVENTION

1. Field Of The Invention

The present invention relates to variable electrical devices, and more particularly, to variable electrical devices having a rotational variable control that can be driven by a motor.

2. Discussion Of The Prior Art

In general, the rotational variable control for a variable electrical device is rotated by an external force. A motor drive unit can be used to create the external force. Thus, an electrical signal can be used to actuate the motor drive unit to adjust the position of a rotational variable control of a variable electrical device. Thus, small voltage signals can be used to control large voltages in high current situations.

A prior art apparatus 100 that adjusts the position of a rotational variable control shaft 102 of a variable electrical device using a motor drive unit 104 is shown in FIG. 1. The variable electrical device in FIG. 1 is a variable transformer 106. By applying an electric signal to the motor drive unit 104, the rotational position of the rotational variable control shaft 102 can be adjusted so as to control the value of voltage transformation by the variable transformer 106.

The variable transformer 106 shown in FIG. 1 includes a toroidal coil 108 in which the value of voltage transformations are changed by movement of a brush 110 along a commutator (not shown). The brush 110 is attached to an arm 112. The rotational variable control shaft 102 is attached to the arm 112 adjacent to the axial center of the toroidal coil 108. As a result of the rotational variable control shaft 102 being rotated, the brush 110 is rotated about the commutator (not shown) so as to change the value of voltage transformation by the variable transformer 106.

As shown in FIG. 1, the motor drive unit 104 is mounted on an upper bearing support plate 114. An upper bearing 116 is mounted in the upper bearing support plate 114 to rotationally support an upper portion of the rotational variable control shaft 102 for the variable transformer 106. A lower bearing 117 is mounted in a lower bearing support plate 118 to provide rotational support for a lower portion of the rotational variable control shaft 102 for the variable transformer 106. The upper bearing support plate 114 and lower bearing support plate 118 are separated by stanchions 120. The variable transformer 106 is positioned between the stanchions 120 and also between the upper bearing support plate 114 and the lower bearing support plate 118.

The rotational variable control shaft 102 of the variable transformer 106 is driven by the motor drive unit 104 using either a belt or gear arrangement in both a clockwise or counter-clockwise rotational movement. FIG. 1 illustrates a gear arrangement for driving the rotational variable control shaft 102. As shown in FIG. 1, a motor gear 122 on the output shaft 124 of the motor drive unit 104 meshes with a drive gear 126 on the rotational variable control shaft 102.

The rotational movement of the rotational variable control shaft 102 in either direction is limited by the activation of limit switches 128*a* and 128*b* that are positioned on the top of the upper bearing support plate 114. FIG. 2 is a top view of a prior art motor driven variable transformer. As shown in FIG. 2, cams 129*a* and 129*b* cause the limit switches 128*a* and 128*b* to turn off power to the motor drive unit 104 at the ends of the rotational range of the rotational variable control shaft 102. The cams 129*a* and 129*b* are mounted axially on the rotational variable control shaft 102 above the upper bearing support plate 114. As the rotational variable control shaft 102 rotates, the cams 129*a* and 129*b* travel about such that they can respectively activate limit switches 128*a* and 128*b* to prevent further rotation at the ends of the rotational range of the rotational variable control shaft 102.

As shown in FIG. 1, the output shaft 124 of the motor drive unit 104 in FIG. 1 is perpendicular to the upper bearing support plate 114. The variable transformer 106 is attached to the lower bearing plate 118. The upper bearing support plate 114 is rigidly held in relation to the variable transformer by the use of bolts 130 through the stanchions 120 to the lower bearing support plate 118. The upper bearing support plate 114 is mounted so that the rotational axis of the rotational variable control shaft 102 is parallel to the output shaft 124 of the motor drive output unit 104.

The prior art apparatus 100 for adjusting the rotational position of a rotational variable control shaft 102, as discussed above, requires that rotational variable control shaft 102 to be aligned with the upper bearing 116 and the lower bearings 117*a* and 117*b*. This alignment through the upper bearing 116 and lowering bearings 117*a* and 117*b* maintains the gear 126 in axial alignment with the gear 122 mounted to the motor drive output shaft 124 of the motor drive output unit 104. The arm 112 of the variable transformer 106 is held in a consistent axial relationship with the toroidal coil 108 by bearings 117*a* and 117*b*, so that the brush 110 applies a constant pressure throughout the entire travel range of the rotational variable control shaft 102. Further, the output shaft 124 of the motor drive unit 104 has to be aligned so as to be in parallel with the rotational variable control shaft 102.

The alignment requirements and use of gears or a belt and pulley system to transmit rotational motion for a prior art motor driven variable transformer, such as shown in FIG. 1, increase the complexity of manufacturing and the overall unit size. The implementation of a simpler and more efficient direct drive method is desirable. The bearing support plates and stanchions may, due to outside forces, become misaligned causing the rotational variable control shaft 102 of the prior art motor driven variable transformer to be in misalignment. This misalignment will degrade the operating capability of the prior art motor driven variable transformer due to binding which hampers smooth and consistent control in driving the rotational variable control shaft. Such binding can also cause bearing failure that may result in an inoperable device.

SUMMARY OF THE INVENTION

Accordingly, the present invention is directed to compliant motor driven variable electrical device that substantially obviates one or more of the problems due to limitations and disadvantages of the related art.

An object of the present invention is to simplify the manufacturing of a motor driven variable electrical device.

An object of the present invention is to simplify the construction of a motor driven variable electrical device.

An object of the present invention is to reduce unit size on smaller variable transformer units where the motor drive is a large portion of the size.

Another object of the present invention is to provide a motor driven variable electrical device that is resistant to problems caused by misalignment.

Another object of the present invention is to reduce the exposure of moving parts in a motor driven variable electrical device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a motor driven electrical device includes: a variable electrical device having a rotational variable control; a first support plate positioned above the variable electrical device; a motor support plate pliably attached to the first support plate using a pliable separator positioned between the motor support plate and the upper support; a motor mounted on the motor support plate, the motor having an output shaft; an interface/control unit coupling the output shaft to the rotational variable control; and stanchions attached to the first support plate for holding the first support plate in a fixed relation with respect to the variable electrical device.

In another aspect, a motor driven electrical device includes: a variable electrical device having a variable electrical device including a rotational variable control; a first support plate positioned above the variable electrical device; a motor pliably attached to the first support plate using a pliable separator positioned between the motor and the upper support, the motor having an output shaft; an interface/control unit coupling the output shaft to the rotational variable control; and stanchions attached to the first support plate for holding the first support plate in a fixed relation with respect to the variable electrical device.

In another aspect, a motor driven electrical device includes: a lower support plate; a variable electrical device mounted on the support plate, the variable electrical device having a rotational variable control; an upper support plate positioned above the variable electrical device; a motor mounted on the upper support plate, the motor having an output shaft; an interface/control unit coupling the output shaft to the rotational variable control; and stanchions that each have a first attachment to the lower support plate and a second attachment to the upper support plate, wherein the first attachment is rigid attachment and the second attachment is a pliable attachment using a pliable separator positioned between the upper substrate and a stanchion.

In yet another aspect, an apparatus for controlling a variable electrical device having a rotational variable control includes: a motor for rotating the variable control of the variable electrical device, the motor having an output shaft; a support plate on which the motor is mounted; a switch mounted on the support plate for controlling the motor; an interface/control unit attached to the output shaft for directly coupling to the rotational variable control, the interface/control unit including a cam for actuating the switch.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
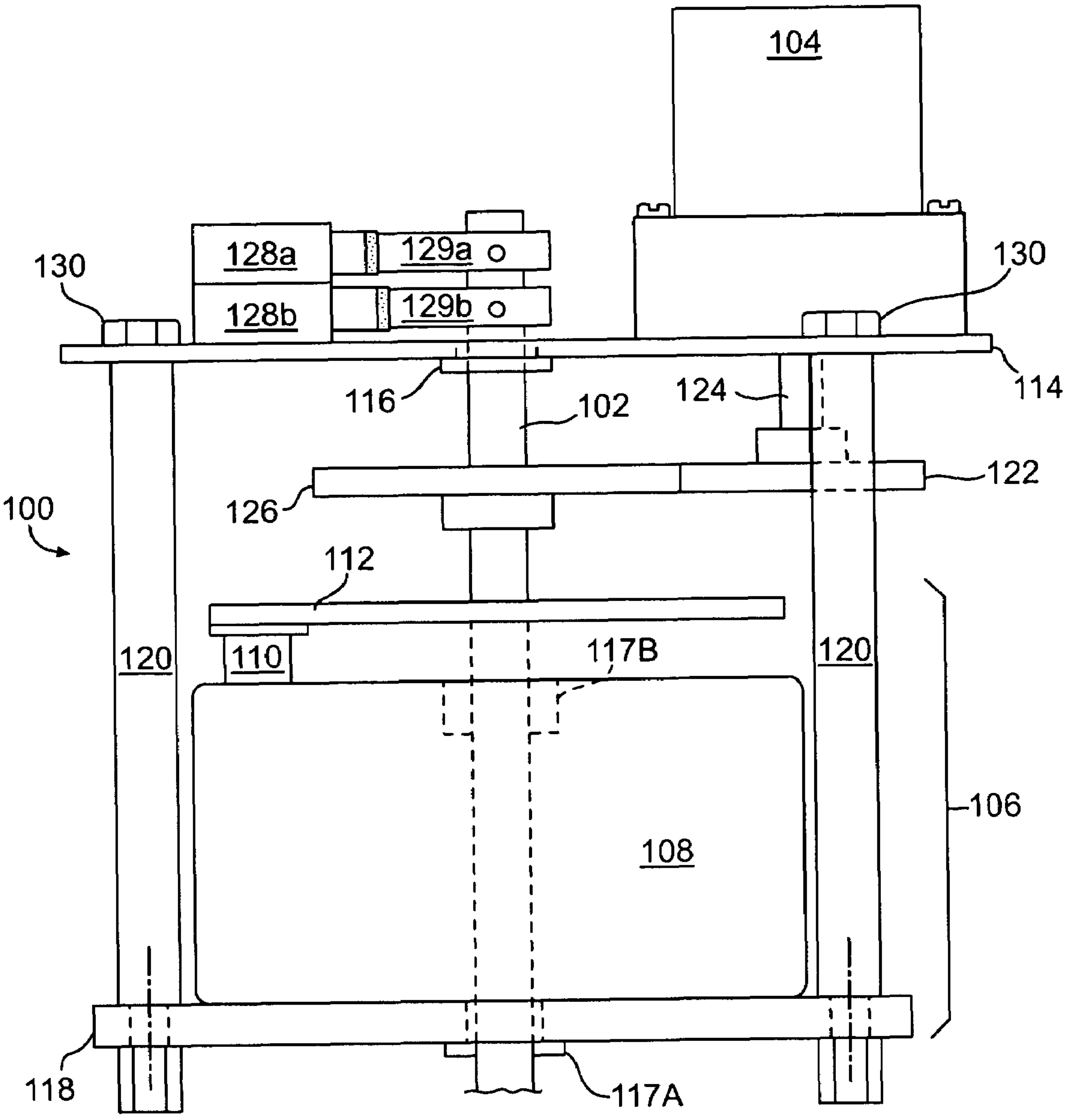
FIG. 1 PRIOR ART
FIG. 1 is a side view of a prior art motor driven variable transformer.
Figure 2:
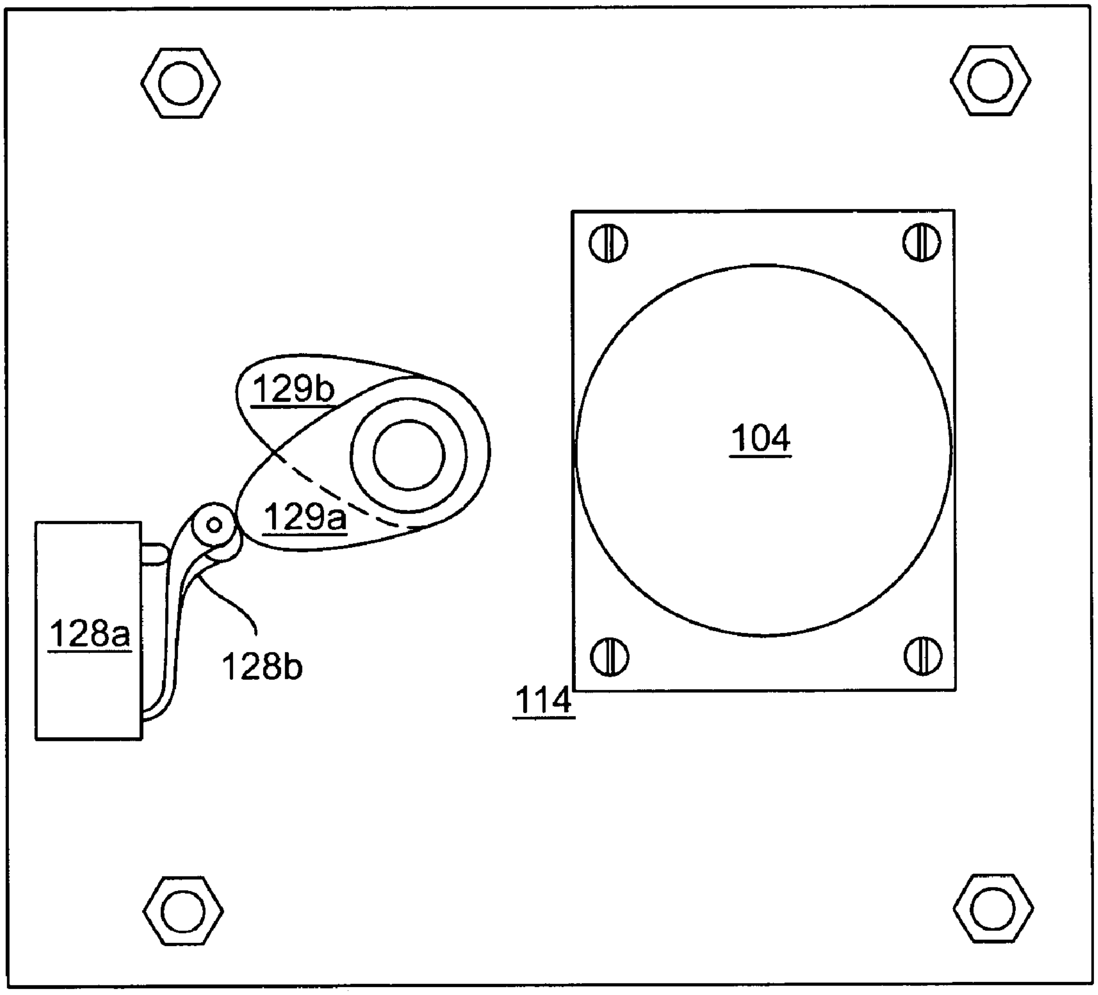
FIG. 2 PRIOR ART
FIG. 2 is a top view of a prior art motor driven variable transformer.
Figure 3:
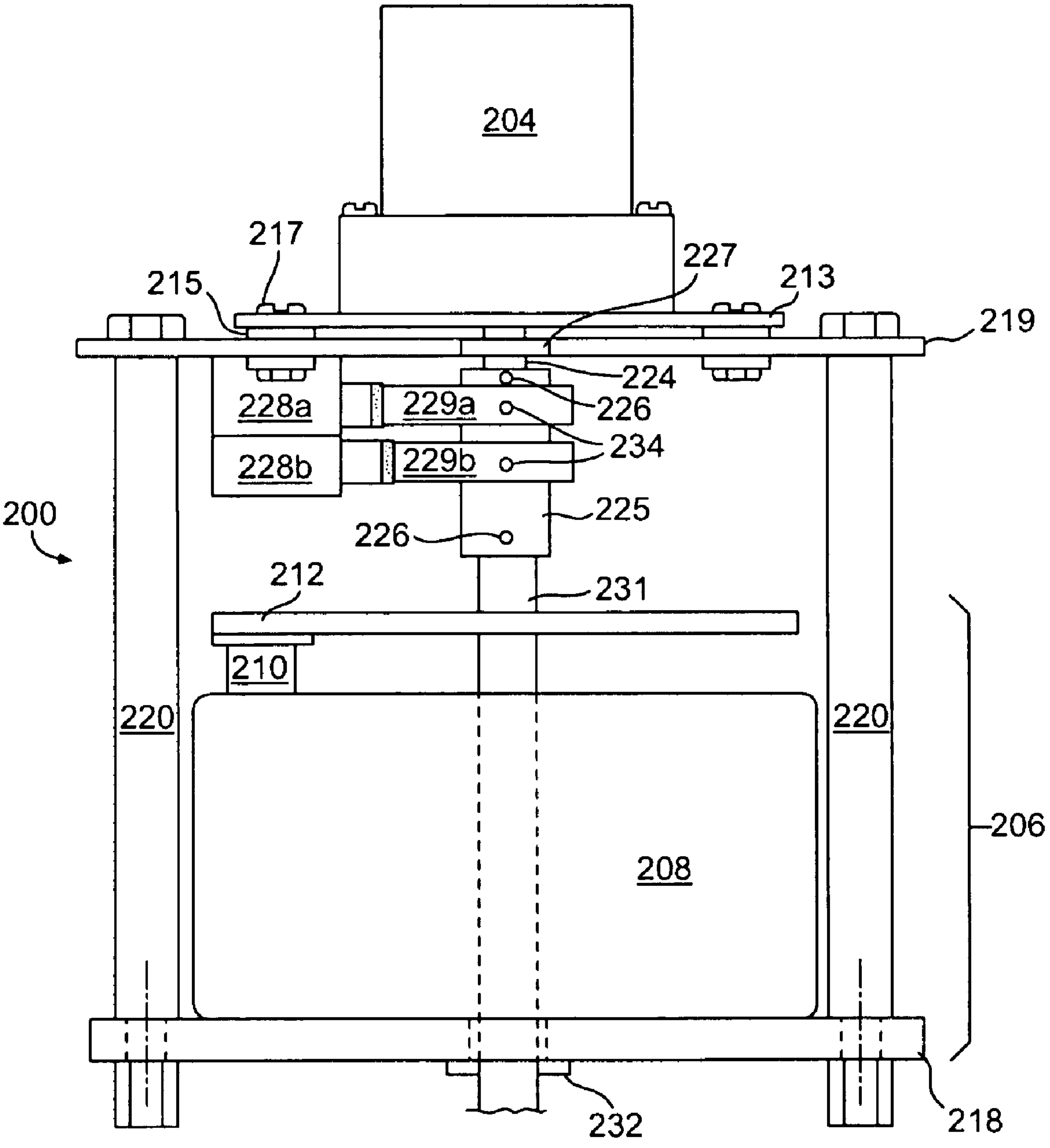
FIG. 3 is a side view of a compliant motor driven variable transformer in accordance with a first exemplary embodiment of the invention.

FIG. 3 is a side view of a compliant motor driven variable transformer in accordance with a first exemplary embodiment of the invention. As shown in FIG. 3, the motor drive unit 204 of an arrangement 200 in accordance with a first exemplary embodiment is mounted on a motor support plate 213. Fasteners 217 are used to pliably attach the motor support plate 213 to an upper support plate 219 by using pliant separators 215 in between the motor support plate 213 and the upper support plate 219 together with the fasteners 217. Bolts, rivets, plastic pins or rubber pins can be used as fasteners 217. The pliant separators 215 can be grommets or bushings formed of a pliable material, such as, but not limited to, silicone or rubber. In the case of grommets, the grommets can be installed in the upper support plate 219 as shown in FIG. 3, in the motor support plate 213 or in both the upper support plate 219 and the motor support plate 213. In yet another alternative, pliant plugs can be used as pliant separators. Such pliant plugs can be configured to plug into both the motor support plate 213 and the upper support plate 219 with pliable ends that spread out so as to hold the upper support plate 219 and the motor support plate 213 together.

As shown in FIG. 3, the output shaft 224 of the motor drive unit 204 is connected to the interface/control unit 225 through a hole 227 in the upper support plate 219. The rotational variable control shaft 231 of the variable transformer 206 is coupled to the output shaft 224 of the motor drive unit 204 through the interface/control unit 225, which is a solid coupling. Set screws 226 on the interface/control unit 225 can be used to both vertically and rotationally couple the rotational variable control shaft 231 and the output shaft 224. In the alternative, the interface/control unit 225 can be a sleeve having a configuration such that the rotational variable control shaft 231 and the output shaft 224 are only rotationally coupled. For example, the interface/control unit 225 can be a sleeve having splines that mate with respective splines on the rotational variable control shaft 231 and the output shaft 224.

A lower bearing support plate 218 is part of the variable transformer 206. A lower bearing 232 in the lower bearing support plate 218 provides rotational support for a lower portion of the rotational variable control shaft 231 of the variable transformer 206. The upper support plate 219 and lower bearing support plate 218 are separated by stanchions 220. The variable transformer 206 is positioned between the stanchions 220 and also between the upper bearing support plate 219 and lower bearing support plate 218.

The variable transformer 206 shown in FIG. 3 includes a toroidal coil 208 in which the value of voltage transformation is changed by movement of a brush 210 along a commutator (not shown). The brush 210 is attached to an arm 212 extending from the rotational variable control shaft 231. The arm 212 can be configured to be either a bar or disk. The rotational variable control shaft 231 is attached to the arm 212 adjacent to the axial center of the toroidal coil 208. As a result of the rotational variable control shaft 231 being rotated, the brush 210 is rotated about the commutator (not shown). Although FIG. 3 depicts an arrangement having only a single variable transformer, the mounting of a motor drive unit on a support plate, which is pliably attached to an upper support plate, can be used in an arrangement in which a single rotational variable control shaft controls a stack of 206 variable transformers.

Figure 4:
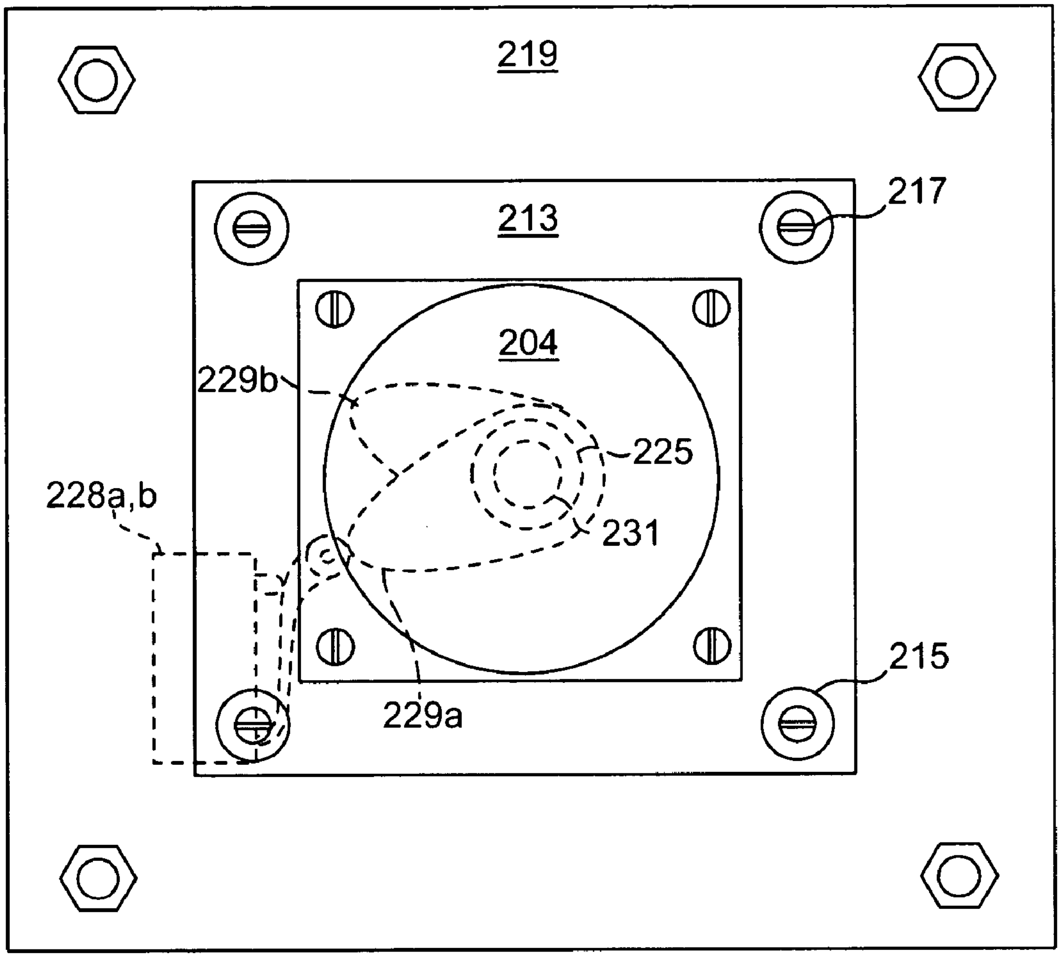
FIG. 4 is a top view of the first exemplary embodiment of the invention.

The rotational movement of the rotational variable control shaft 231 in either direction is limited by the activation of limit switches 228*a* and 228*b* that are positioned underneath the upper support plate 219 so as to be positioned between the upper support plate and the variable transformer 206. FIG. 4 is a top view of the first exemplary embodiment of the invention. As shown in FIG. 4, cams 229*a* and 229*b* cause the limit switches 228*a* and 228*b* to turn off power to the motor drive unit 204 at the ends of the rotational range of the rotational variable control shaft 231. The cams 229*a* and 229*b* are mounted axially on the interface/control unit 225. The position of the cams 229*a* and 229*b* on the interface/control unit 225 can be adjusted through the use of set screws 234 on the cams 229*a* and 229*b*. As the interface/control unit 225 rotates, the cams 229*a* and 229*b* travel about such that they can respectively activate limit switches 228*a* and 228*b* to prevent further rotation at the ends of the rotational range of the rotational variable control shaft 231 FIG. 3. The interface/control unit 225 provides an interface between the motor drive unit 204 and the variable transformer by coupling them, as well as, control by being a mounting surface for cams 229*a* and 229*b* that activate limit switches 228*a* and 228*b*.

The arrangement 200 shown in FIG. 3 simplifies construction of a motor driven variable transformer in that the output shaft 224 of the drive motor unit 204 is connected directly to the rotational variable control shaft 231 of the variable transformer 206 with the interface/control unit 225, which is a solid coupling. Axial compliance between the output shaft 224 of the drive motor unit 204 and the rotational variable control shaft 231 is achieved and maintained by the pliability of the pliable separators 215 used in the mounting of the motor support plate on the upper support plate 219. By mounting the cams 229*a* and 229*b* on the interface/control unit 225, space efficiency is increased in terms of the vertical footprint and the exposure of moving cams is decreased.

Figure 5:
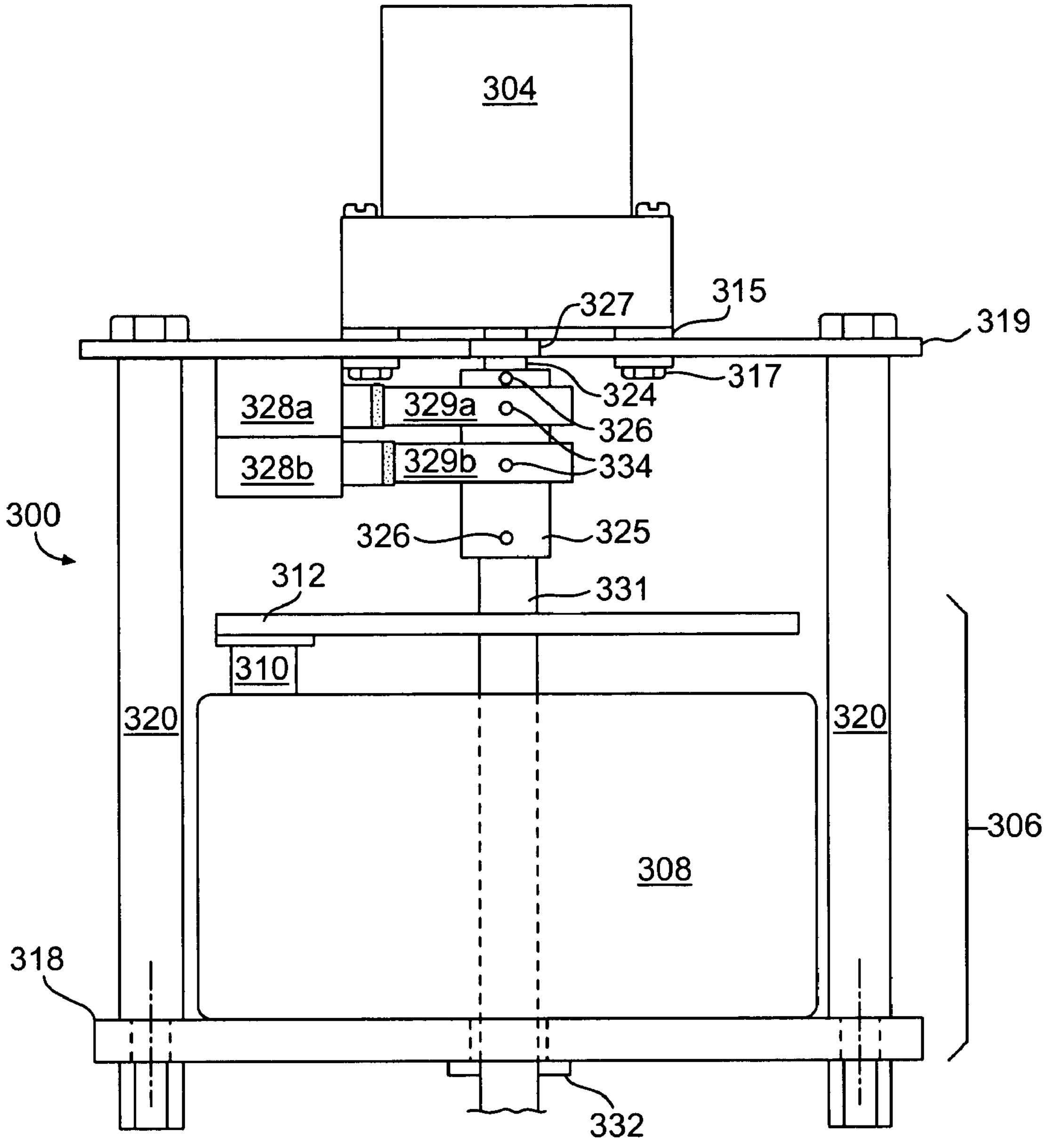
FIG. 5 is a side view of a compliant motor driven variable transformer in accordance with a second exemplary embodiment of the invention.

FIG. 5 is a side view of a compliant motor driven variable transformer in accordance with a second exemplary embodiment of the invention. As shown in FIG. 5, the motor drive unit 304 of an arrangement 300 in accordance with the second exemplary embodiment is mounted directly on an upper support plate 319. Fasteners 317 are used to pliably attach the motor drive unit 304 to the upper support plate 319 by using pliant separators 315 that are positioned in between the motor drive unit 304 and the upper support plate 319 together with the fasteners 317. Bolts, rivets, plastic pins or rubber pins can be used as fasteners 317. The pliant separators 315 can be grommets or bushings formed of a pliable material, such as but not limited to silicone or rubber. In the case of grommets, the grommets can be installed in the upper support plate 319, as shown in FIG. 5.

An output shaft 324 of the motor drive unit 304 in FIG. 5 is connected to the interface/control unit 325 through a hole 327 in the upper support plate 319. A rotational variable control shaft 331 of a variable transformer 306 is coupled to the output shaft 324 of the motor drive unit 304 through the interface/control unit 325, which is a solid coupling. Set screws 326 on the interface/control unit 325 can be used to both vertically and rotationally couple the rotational variable control shaft 331 and the output shaft 324. In the alternative, the interface/control unit 325 can be a sleeve having a configuration such that the rotational variable control shaft 331 and the output shaft 324 are only rotationally coupled. For example, the interface/control unit 325 can be a sleeve having splines that mate with respective splines on the rotational variable control shaft 331 and the output shaft 324.

A lower bearing support plate 318 is part of the variable transformer 306. A lower bearing 332 in a lower bearing support plate 318 provides rotational support for the rotational variable control shaft 331 of the variable transformer 306. The upper support plate 319 and lower bearing support plate 318 are separated by stanchions 320. The variable transformer 306 is positioned between the stanchions 320 and also between the upper bearing support plate 319 and lower bearing support plate 318.

The variable transformer 306 shown in FIG. 5 includes a toroidal coil 308 in which the value of voltage transformation is changed by movement of a brush 310 along a commutator (not shown). The brush 310 is attached to an arm 312 extending from the rotational variable control shaft 331. The arm 312 can be configured to be either a bar or disk. The rotational variable control shaft 331 is attached to the arm 312 adjacent to the axial center of the toroidal coil 308. As a result of the rotational variable control shaft 331 being rotated, the brush 310 is rotated about the commutator (not shown). Although FIG. 5 depicts an arrangement having only a single variable transformer in which the motor drive unit is pliably mounted to an upper support plate can be used in an arrangement having a single rotational variable control shaft that controls a stack of 306 variable transformers.

Figure 6:
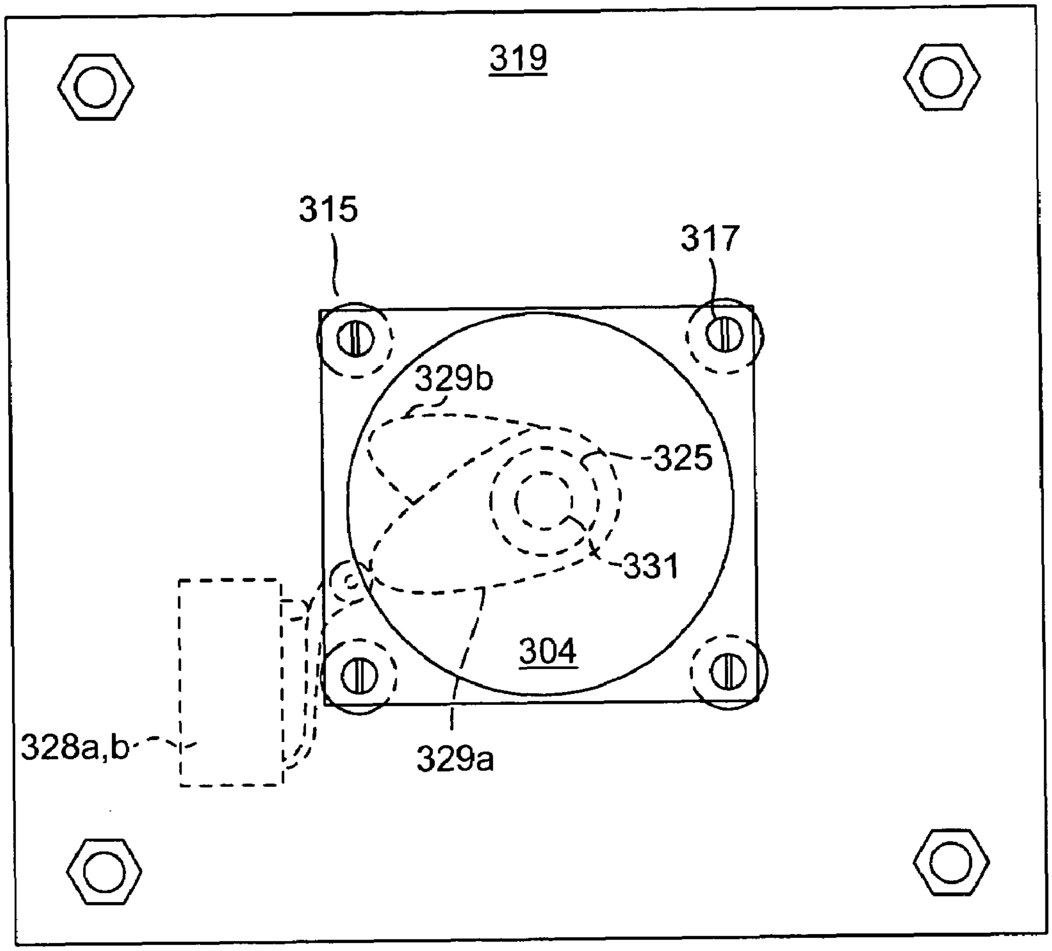
FIG. 6 is a top view of the second exemplary embodiment of the invention.

The rotational movement of the rotational variable control shaft 331 in either direction is limited by the activation of limit switches 328*a* and 328*b* that are positioned underneath the upper support plate 319 so as to be positioned between the upper support plate 319 and the variable transformer 306. FIG. 6 is a top view of the second exemplary embodiment of the invention. As shown in FIG. 6, cams 329*a* and 329*b* cause the limit switches 328*a* and 328*b* to turn off power to the motor drive unit 304 at the ends of the rotational range of the rotational variable control shaft 331. The cams 329*a* and 329*b* are mounted axially on the interface/control unit 325. The position of the cams 329*a* and 329*b* on the interface/control unit 325 can be adjusted through the use of set screws 334 on the cams 329*a* and 329*b*. As the interface/control unit 325 rotates, the cams 329*a* and 329*b* travel about such that they can respectively activate limit switches 328*a* and 328*b* to prevent further rotation at the ends of the rotational range of the rotational variable control shaft 331. The interface/control unit 325 provides an interface between the motor drive unit 304 and the variable transformer by coupling them, as well as, control by being a mounting surface for cams 329*a* and 329*b* that activate limit switches 328*a* and 328*b*.

The arrangement 300 shown in FIG. 5 simplifies construction of a motor driven variable transformer in that the output shaft 324 of the drive motor unit 304 is connected directly to the rotational variable control shaft 331 of the variable transformer 306 with the interface/control unit 325, which is a solid coupling. Further, the arrangement 300 is simple to manufacture since the motor drive unit is mounted directly on the upper support plate using pliable separators. Axial compliance between the output shaft 324 of the drive motor unit 304 and the rotational variable control shaft 331 is achieved and maintained by the pliability of the pliable separators 315 used in the mounting of the motor drive unit. As discussed above, the mounting of cams 329*a* and 329*b* on the interface/control unit 325 increases space efficiency in terms of the vertical footprint. In addition, the exposure of moving cams is decreased.

Figure 7:
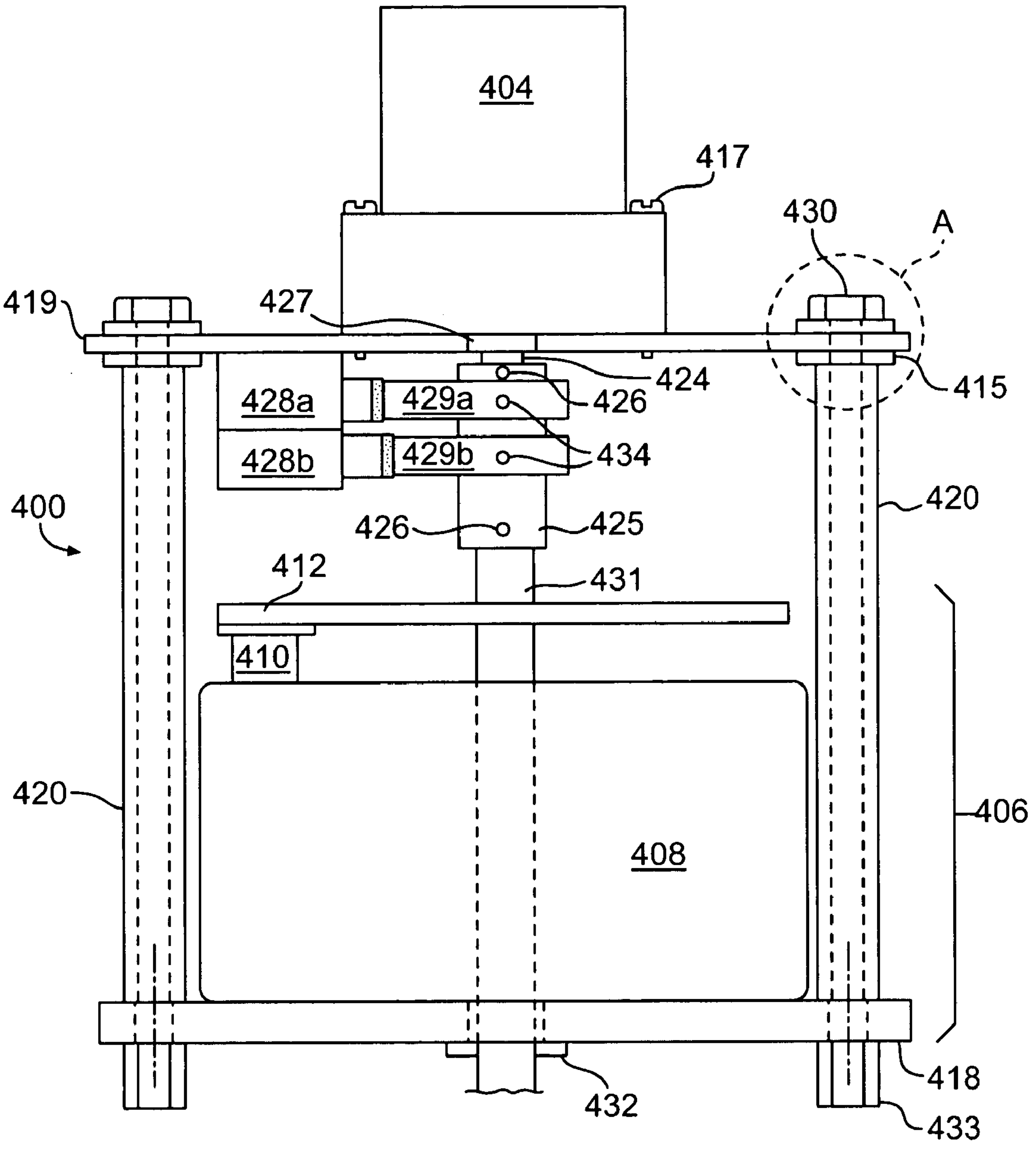
FIG. 7 is a side view of a compliant motor driven variable transformer in accordance with a third exemplary embodiment of the invention.

FIG. 7 is a side view of a compliant motor driven variable transformer in accordance with a third exemplary embodiment of the invention. As shown in FIG. 7, the motor drive unit 404 of an arrangement 400 in accordance with the third exemplary embodiment is mounted directly on an upper support plate 419. Fasteners 417 are used to attach the motor drive unit 404 to the upper support plate 419. Bolts, rivets, plastic pins or rubber pins can be used as fasteners 417.

An output shaft 424 of the motor drive unit 404 in FIG. 7 is connected to the interface/control unit 425 through a hole 427 in the upper support plate 419. A rotational variable control shaft 431 of a variable transformer 406 is coupled to the output shaft 424 of the motor drive unit 404 through the interface/control unit 425, which is a solid coupling. Set screws 426 on the interface/control unit 425 can be used to both vertically and rotationally couple the rotational variable control shaft 431 and the output shaft 424. In the alternative, the interface/control unit 425 can be a sleeve having a configuration such that the rotational variable control shaft 431 and the output shaft 424 are only rotationally coupled. For example, the interface/control unit 425 can be a sleeve having splines that mate with respective splines on the rotational variable control shaft 431 and the output shaft 424.

A lower bearing support plate 418 is part of the variable transformer assembly 406. A lower bearing 432 in a lower bearing support plate 418 provides rotational support for the rotational variable control shaft 431 of the variable transformer 406. The upper support plate 419 and lower bearing support plate 418 are separated by stanchions 420. The variable transformer 406 is positioned between the stanchions 420 and also between the upper bearing support plate 419 and lower bearing support plate 418.

Figure 8:
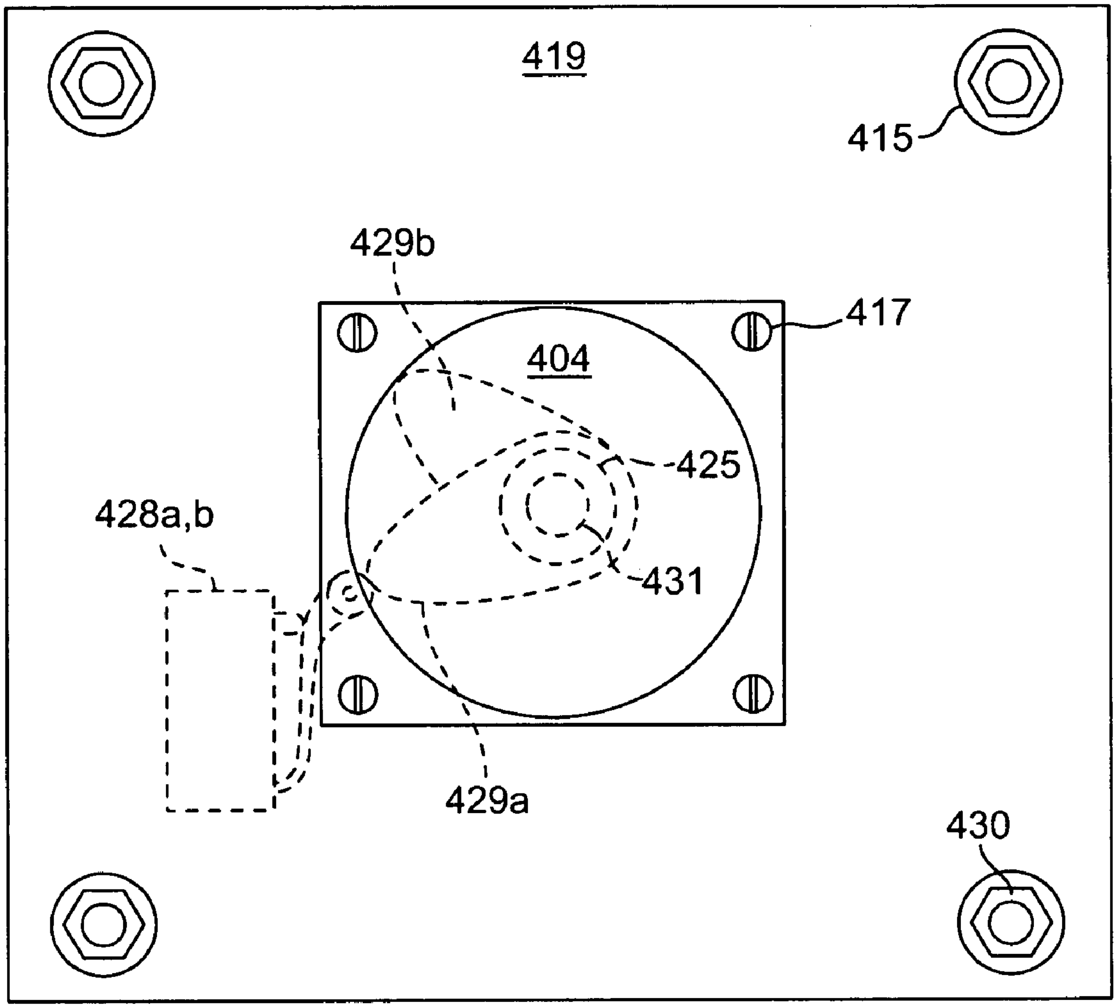
FIG. 8 is a top view of the third exemplary embodiment of the invention.

The rotational movement of the rotational variable control shaft 431 in either direction is limited by the activation of limit switches 428*a* and 428*b* that are positioned underneath the upper support plate 419 so as to be positioned between the upper support plate 419 and the variable transformer 406. FIG. 8 is a top view of the third exemplary embodiment of the invention. As shown in FIG. 8, cams 429*a* and 429*b* cause the limit switches 428*a* and 428*b* to turn off power to the motor drive unit 404 at the ends of the rotational range of the rotational variable control shaft 431. The cams 429*a* and 429*b* are mounted axially on the interface/control unit 425. The position of the cams 429*a* and 429*b* on the interface/control unit 425 can be adjusted through the use of set screws 434 on the cams 429*a* and 429*b*. As the interface/control unit 425 rotates, the cams 429*a* and 429*b* travel about such that they can respectively activate limit switches 428*a* and 428*b* to prevent further rotation at the ends of the rotational range of the rotational variable control shaft 431 in FIG. 7. The interface/control unit 425 provides an interface between the motor drive unit 404 and the variable transformer by coupling them, as well as, control by being a mounting surface for cams 429*a* and 429*b* that activate limit switches 428*a* and 428*b*.

The upper support plate 419 FIG. 7 is pliably attached to the stanchions 420 using pliant separators 415 that are positioned in between the upper support plate 419 and the stanchion 420 together with the fasteners 430. The pliant separators 415 can be grommets or bushings formed of a pliable material, such as but not limited to silicone or rubber. In the case of grommets, the grommets are installed in the upper support plate 419, as shown in FIG. 7. In the case of bushings, bushing material should be at least be in between upper support plate 419 and the stanchion 420 such that there is no contact between the upper support plate 419 and the stanchion 420.

The lower bearing support plate 418 is rigidly attached to the stanchions 420. As shown in FIG. 7, bolts 430 that pass through the stanchions 420 hold the stanchions rigidly against the lower bearing support plate 418 through the use of nuts 433. In the alternative, the stanchions can be machined to bolt ends such that the upper support plate is pliably attached with a nut and the lower bearing support plate is rigidly attached with a nut. In another alternative, the stanchions can be a sleeve with threaded ends such that the upper support plate is pliably attached with a bolt and the lower bearing support plate is rigidly attached with another bolt.

Figure 9:
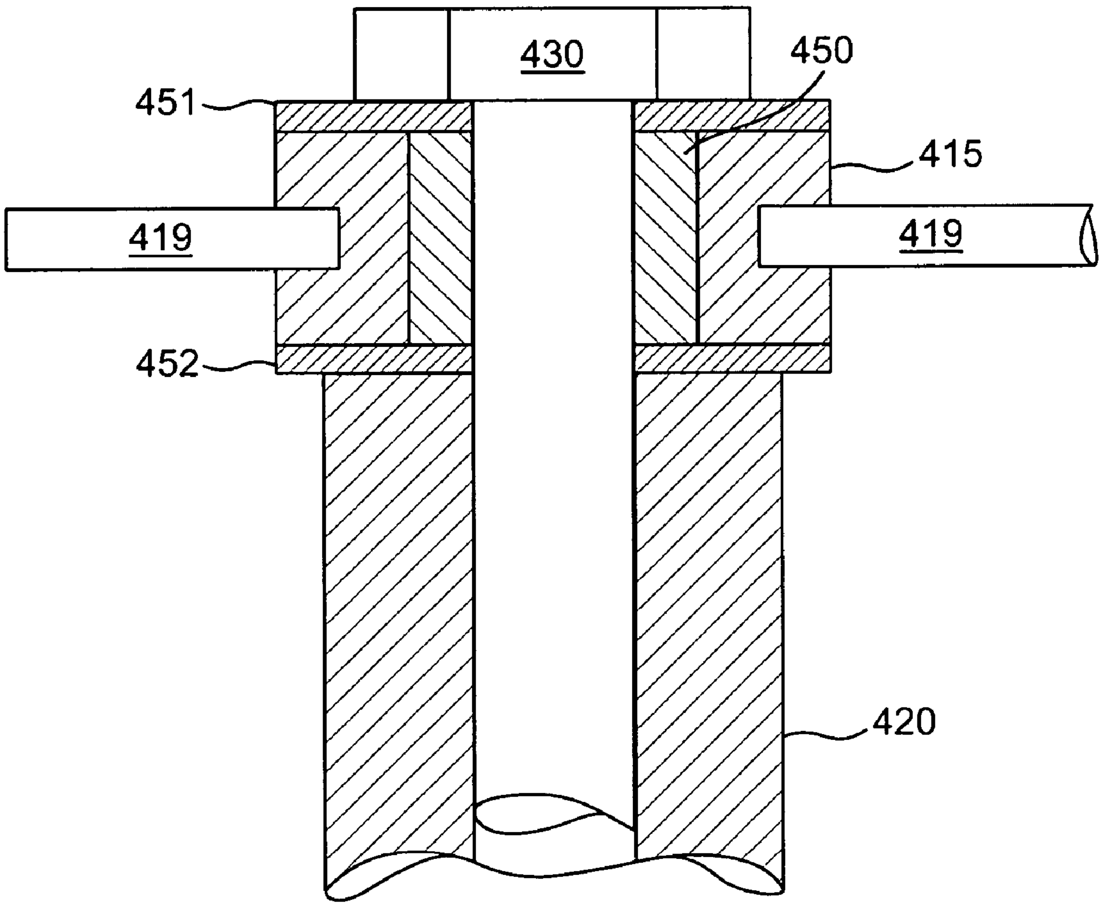
FIG. 9 is a sectional view of a portion of the third exemplary embodiment as designated by the circle A in FIG. 7 for a pliably attachment to a stanchion using shims and washers.

FIG. 9 is a sectional view of a portion of the third exemplary embodiment as designated by the circle A in FIG. 7 for a pliably attachment to a stanchion using shims and washers. As shown in FIG. 9, a bolt 430 through a shim 450 between a pair of washers 451 and 452 holds a pliant separator 415 in place such that the upper support plate 319 is pliably attached to the stanchion 420. In the alternative, the stanchion 420 can be configured to be wider and the head of the bolt can be configured to be wider such that pliably attachment of an upper support plate to a stanchion can be achieved without washers 451 and 452.

Figure 10:
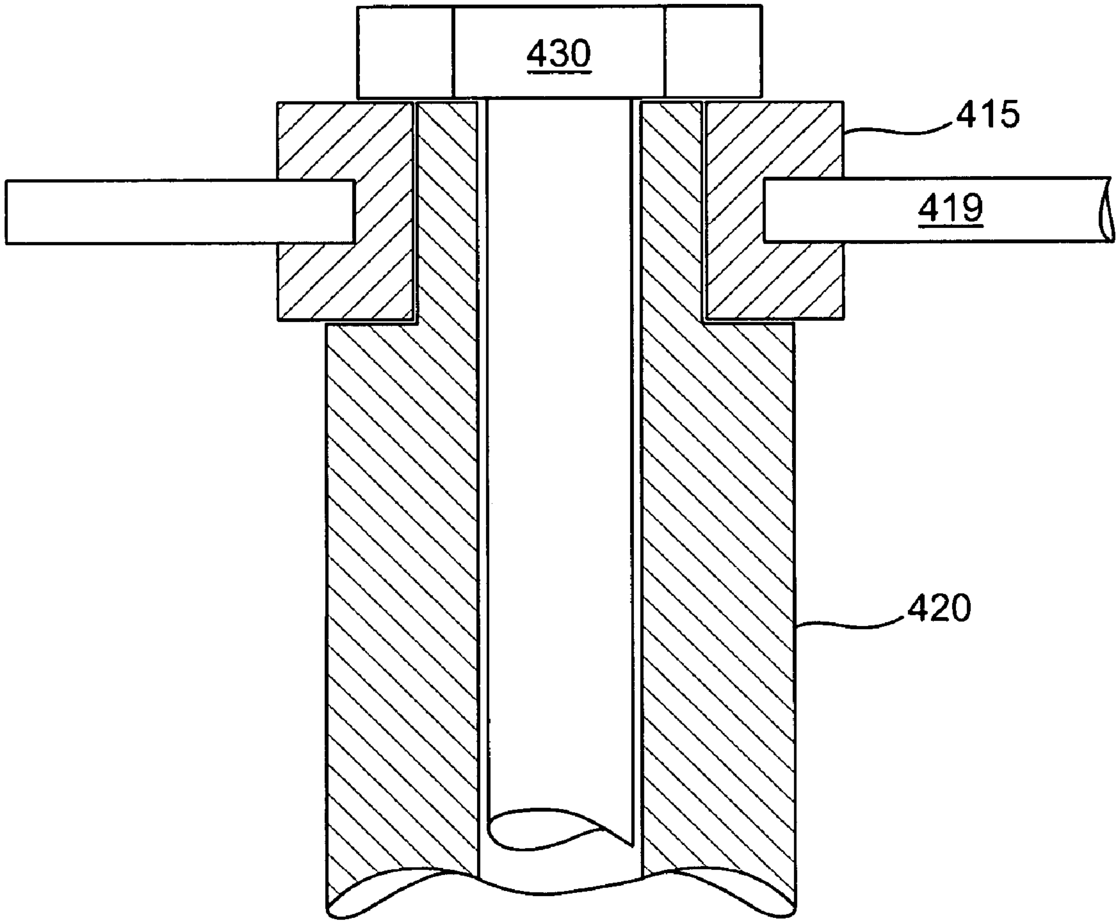
FIG. 10 is a sectional view of a portion of the third exemplary embodiment as designated by the circle A in FIG. 7 for a stanchion and bolt configured for pliably attachment of a support plate to the stanchion without using shims and washers.

FIG. 10 is a sectional view of a portion of the third exemplary embodiment as designated by the circle A in FIG. 7 for a stanchion and bolt configured for pliable attachment of a support plate to the stanchion without using shims and washers. As shown in FIG. 10, the stanchion 420 can be configured to attach the upper plate 419 with a pliant separator 415 thereon with just a bolt 430. In another alternative, the stanchion can have an end with exposed threads such that the upper support plate is pliably attached with a nut and washer over the pliant separator 415.

The variable transformer 406 shown in FIG. 7 includes a toroidal coil 408 in which the value of voltage transformation is changed by movement of a brush 410 along a commutator (not shown). The brush 410 is attached to an arm 412 extending from the rotational variable control shaft 431. The arm 412 can be configured to be either a bar or disk. The rotational variable control shaft 431 is attached to the arm 412 adjacent to the axial center of the toroidal coil 408. As a result of the rotational variable control shaft 431 being rotated, the brush 410 is rotated about the commutator (not shown). Although FIG. 7 depicts an arrangement having only a single variable transformer in which the motor drive unit is pliably attached to a stanchion can be used in an arrangement having a single rotational variable control shaft that controls a stack of 406 variable transformers.

Although embodiments of the present invention described above shows a lobe cam physically actuating a roller switch, other cams that actuate other types of switches can be used. For example, a magnetic cam can be used that operates a magnetic switch. In another example, an optical cam with a reflective surface can be used that operates an optical switch.

The arrangement 400 shown in FIG. 7 simplifies construction of a motor driven variable transformer in that the output shaft 424 of the drive motor unit 404 is connected directly to the rotational variable control shaft 431 of the variable transformer 406 with the interface/control unit 425, which is a solid coupling. Further, the arrangement 400 is simple to manufacture since the motor drive unit is mounted directly on the upper support plate. Axial compliance between the output shaft 424 of the drive motor unit 404 and the rotational variable control shaft 431 is achieved and maintained by the pliability of the pliable separators 415 used in the mounting of the upper support plate onto the stanchions 420. As discussed above, the mounting of cams 429*a* and 429*b* on the interface/control unit 425 increases space efficiency in terms of the vertical footprint. In addition, the exposure of moving cams is decreased.

It will be apparent to those skilled in the art that various modifications and variations can be made in the compliant motor driven variable electrical device of the present invention without departing from the spirit or scope of the invention. Thus, it is intended that the present invention cover the modifications and variations of this invention provided they come within the scope of the appended claims and their equivalents.

What is claimed is:

1. A motor driven electrical device, comprising:

a drive unit arranged on a frame, the drive unit having a first shaft;

a variable electrical device having a second shaft; and a plurality of pliable members arranged on the frame to provide coaxial alignment of the first shaft and the second shaft, each pliable member being eccentric to the first and second shafts.

2. The motor driven electrical device of claim 1, wherein the frame includes a plate connected to a plurality of stanchions by the plurality of pliable members.

3. The motor driven electrical device of claim 1, wherein the plurality of pliable members are pliable stanchions supporting a plate.

4. The motor driven electrical device of claim 1, wherein the drive unit is mounted to the frame by the plurality of pliable members.

5. The device of claim 1, further comprising an interface unit to couple the first shaft of the drive unit to the second shaft of the variable electrical device.

6. The device of claim 5, wherein the interface unit includes a cam to control a rotational movement of the second shaft.

7. The device of claim 6, wherein the cam attached to the interface unit actuates a switch to control the rotational movement of the second shaft.

8. The device of claim 5, wherein the interface unit is a solid coupling.

9. The device of claim 1, wherein the drive unit includes a motor arranged on the frame.

10. The device of claim 9, wherein the motor is mounted on the frame by the plurality of pliable members to provide coaxial alignment of the first shaft and the second shaft.

11. The device of claim 9, wherein the motor is mounted on the frame, the plurality of pliable members connecting a plate to a plurality of stanchions to provide coaxial alignment of the first shaft and the second shaft.

12. The device of claim 9, wherein the motor is mounted on the frame, wherein the plurality of pliable members are pliable stanchions to provide coaxial alignment of the first shaft and the second shaft.

13. The device of claim 9, wherein a support on which the motor is mounted is connected to the frame by the plurality of pliable members to provide coaxial alignment of the first shaft and the second shaft.

14. A motor driven electrical device, comprising:

a drive unit arranged on a frame, the drive unit having a first shaft;

a variable electrical device having a second shaft;

a plurality of pliable members arranged on the frame to provide coaxial alignment of the first shaft and the second shaft; and an interface unit to couple the first shaft of the drive unit to the second shaft of the variable electrical device, the interface unit including a cam to control a rotational movement of the second shaft.

15. The device of claim 14, wherein the cam attached to the interface unit actuates a switch to control the rotational movement of the second shaft.

16. A motor driven electrical device, comprising:

a drive unit arranged on a frame, the drive unit having a first shaft;

a variable electrical device having a second shaft; and a plurality of pliable members arranged on the frame to provide coaxial alignment of the first shaft and the second shaft, each pliable member having a geometric center that is offset from the axis of the first and second shafts.

* * * * *